Figure 1:
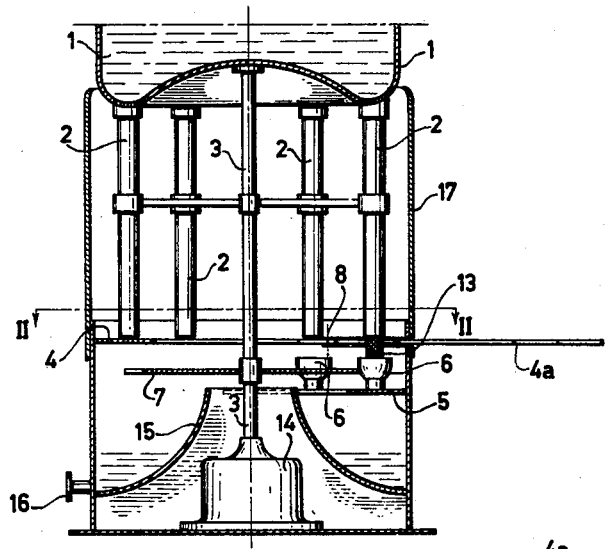

Aug. 4, 1964

G. DE BOER 3,142,904

DEVICE FOR PERIODICALLY FILLING CHEESE MOULDS
WITH A METERED LUMP OF CURD

Filed April 16, 1963

# United States Patent Office 3,142,904
Patented Aug. 4, 1964

3,142,904
DEVICE FOR PERIODICALLY FILLING CHEESE MOULDS WITH A METERED LUMP OF CURD
Geert de Boer, Lippenhuizen, Netherlands, assignor to N.V. Volma, Gorredijk, Netherlands, a Netherlands limited-liability company
Filed Apr. 16, 1963, Ser. No. 273,483
Claims priority, application Netherlands Apr. 17, 1962
6 Claims. (Cl. 31—13)

The invention relates to a device for periodically filling cheese moulds with a measured quantity of curd in a non liquid condition, the said device comprising a number of sieving cylinders arranged in a closed path and movable therealong, the sieving cylinders on their upper side at one or more locations being connected with a feeder for whey/curd and on their lower side cooperating with a stationary table, provided with at least one aperture, the device further comprising a conveyor for one or more cheese moulds, a portion of the path of a cheese mould being situated under the aperture in the said table. Such a device is known in the art.

In this known filling machine the sieving cylinders are advanced stepwise in such a way that they successively arrive over the aperture in the stationary table, whereupon by way of a stamper the lump of curd is pressed into the cheese mould which is thereunder. This discontinuously operating device is disadvantageous in that no great production capacity can be achieved thereby, the presence of stampers complicating the process from the mechanical view point.

It is an object of the invention to provide a device, which ensures a continuous process and avoids the disadvantages experienced in the known device. This is realized according to the invention in the way that the dimension of the aperture in the table—as measured in the direction of movement of the sieving cylinders—is greater than the diameter of the sieving cylinder and that the cheese mould conveyor moves synchroneously with the sieving cylinders. Due to this feature the curd mass sinks due to pressure exerted by the column of whey/curd into the cheese mould during the time which lapses between the downward movement of the mass of curd and the severance thereof, which lapse of time may be defined by regulating the advancing speed of the sieving cylinders through the closed path and by adapting the length of that portion of the track, in which the cheese mould is under the cylinder, to the requirements imposed by production. Due to the operative speed reached in this way and also because of the curd mass being held under pressure in the mould for some time there is formed a cheese which is not impaired by enclosed air.

Due to the gliding of the lower side of the curd cake on the table the pores on the underneath face of the lump of curd are closed before the curd enters the mould. On the sides of the curd mass this has been already effected in the cylinder and on the upper face of the piece of curd this is ensured due to the gliding of the curd cake along the underneath face of the table, so that practically no air can penetrate the mass in the cylinder during discharge of the cheese after the pressure of the curd/whey column has diminished when the cheese leaves the machine.

It is a further object of the invention to avoid the need for the application of a separate cutting element and the operating mechanism required therefor.

Finally it is an object of the invention to start the device with the stationary table serving for some time as a continuous obturating element.

The invention will now be described with regard to the drawing in which a machine according to the invention is shown.

Figure 2:
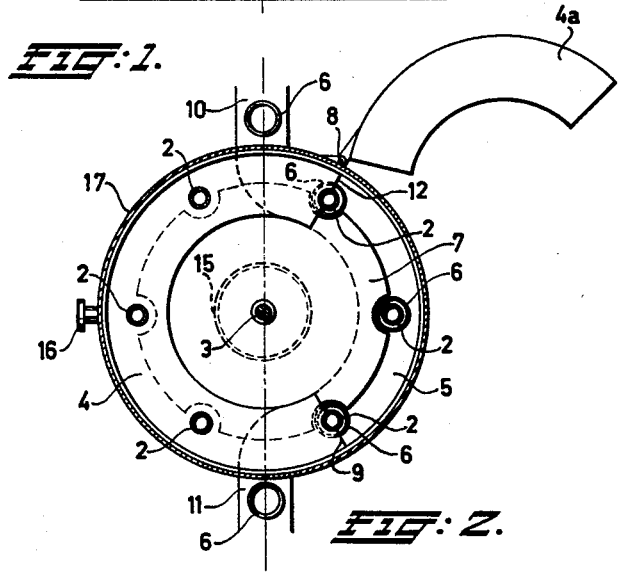

In the drawing:
FIG. 1 shows a longitudinal section of the machine.
FIG. 2 is a cross section according to the line II—II in FIGURE 1.

A receptacle 1 to which are secured some perforated cylinders 2 is mounted for rotation around a shaft 3. The cylinders glide on or just above a stationary table 4. The portion 4ª thereof (pivotable about an axle 8) is shown swung away therefrom. Beneath this portion 4ª is a path 5 along which is conveyed a number of cheese moulds 6, which by way of a conveyor 10 are moved forward and taken along by a star wheel 7 and thereupon fed out along a conveyor 11.

Arranged at the point where the cylinders 2 once again reach the table 4 is a cutting knife 9, for which the edge of the aperture in the table 4 can serve.

Proceeding according to the direction of rotation the curd cake on leaving the table 4 (indicated by the edge 12) will be pressed downwardly into the cheese mould 6 and cut off on reaching again the table 4 (at point 9). The cheese mould, filled with a preformed piece of curd 13, leaves the machine by way of a belt 11.

The machine is driven by a source of power 14. The flowing off whey is collected in a receptacle 15 and withdrawn via an outlet 16. A screen 17 prevents splashing from the machine.

Before setting the machine into motion the portion 4ª is again inserted in the table 4, which is then continuous, whereby the cylinders can be filled with the whey/curd mass from the receptacle 1.

It should be noted that the height of the track 5 might be made adjustable in order to adapt the same to the volume of the cheese moulds 6 employed. The perforation of the sieving cylinders 2 can be further chosen in such a way that there is a constant ratio between the eduction of the whey and of the curd. The size of the perforations can also be made adjustable.

What I claim is:
1. A device for filling successive cheese moulds with measured quantities of curd in non-liquid condition, the said device comprising a plurality of sieve cylinders arranged in a closed path and continuously movable therealong, said cylinders having upper and lower ends, means for feeding a mixture of whey and curd to the upper ends of the cylinders, a stationary table located beneath the cylinders with the lower ends thereof proximate the table, said table being a stationary table provided with at least one aperture having an extent as measured in the direction of movement of the sieve cylinders which is greater than the diameter of a sieve cylinder, the device further comprising a conveyor for a plurality of cheese moulds moving synchronously with the continuously moving sieve cylinders with the moulds in registry with the cylinders, a portion of the path of a cheese mould being situated under the aperture in the said table, whereby curd is freely deposited from the cylinders into the associated moulds and is subsequently severed by the table at the edge of the aperture.

2. A device according to claim 1, wherein said table at the edge of the aperture is constituted as a cutting edge.

3. A device according to claim 1, comprising a portion of the table supported for pivotal movement and capable of being swung outwardly and inwardly for respectively opening and closing the aperture in the stationary table.

4. A device according to claim 1 wherein said closed path is circular.

5. Apparatus for filling cheese moulds with measured quantities of curd in a non-liquid condition, said apparatus comprising: a plurality of vertical cylinders arranged around a closed path, means supporting said cylinders for continuous advancement along said path, said cylinders having upper and lower ends which are open, means for introducing a mixture of curd and whey into the upper ends of the cylinders, a stationary table located immediately below the lower ends of the cylinders and supporting the curd and whey mixture in each of the cylinders as the latter move around the closed path, said table including a fixed portion and a displaceable portion, said fixed portion being provided with an opening corresponding to the shape of the displaceable portion, the displaceable portion being supported for movement between a first position in which said displaceable portion is accommodated in the opening of the fixed portion to define a continuous surface therewith and a second position in which the displaceable portion is displaced with respect to the fixed portion to leave the opening in the fixed portion exposed, means for advancing cheese moulds in synchronism with the cylinders and in registry therewith along a path at least in part beneath the opening in the fixed portion of the table whereby curd is free to descend from the cylinders into the corresponding moulds when the cylinders pass over the opening in the fixed portion and the displaceable portion is in the second position thereof, said opening in the fixed portion having an extent as measured in the direction of advancement of the cylinders which is greater than the diameter of a sieve cylinder and is sufficient to allow a determined quantity of curd to descend into the moulds, said fixed portion of the table having a cutting edge bounding the opening to sever the curd descending from the cylinders as the latter pass said cutting edge during advancement along said path.

6. Apparatus as claimed in claim 5 wherein said cylinders are arranged around a circular path, said table being a circular annulus the greater portion of which is the fixed portion and the lesser portion being the displaceable portion, said apparatus further comprising means pivotally supporting the displaceable portion from the fixed portion for pivotal movement in the plane of said table between said first and second positions.

References Cited in the file of this patent
UNITED STATES PATENTS 3,098,297   De Boer _____ July 23, 1963

FOREIGN PATENTS 929,945   Germany _____ July 7, 1955
77,797   Netherlands _____ Apr. 15, 1955